United States Patent [19]

Rizzetto

[11] Patent Number: 5,016,383

[45] Date of Patent: May 21, 1991

[54] FISH BAIT APPLICATOR

[76] Inventor: Randall Rizzetto, 1000 Estes St., #46, El Cajon, Calif. 92020

[21] Appl. No.: 486,811

[22] Filed: Mar. 1, 1990

[51] Int. Cl.⁵ ............................................. A01K 97/00
[52] U.S. Cl. ......................................... 43/4; 223/102; 223/104
[58] Field of Search ................. 43/1, 4, 4.5; 223/102, 223/104, 99

[56] References Cited

U.S. PATENT DOCUMENTS

| 6,025 | 1/1849 | Hilbert | 223/102 |
| 1,790,492 | 1/1931 | Sopshack | 223/104 |
| 1,915,876 | 6/1933 | Wallace | 43/4 |
| 2,603,026 | 7/1952 | Duty . | |
| 2,880,545 | 4/1959 | Stadler | 43/4 |
| 3,193,962 | 7/1965 | Simpson . | |
| 3,521,395 | 7/1970 | Klemkowski | 43/4 |
| 3,541,980 | 11/1970 | Barker | 223/104 |
| 3,893,603 | 7/1975 | Rush | 223/104 |
| 4,559,734 | 12/1985 | Sauer et al. . | |
| 4,674,220 | 6/1987 | Bearce, Jr. et al. . | |
| 4,706,403 | 7/1987 | Reynolds . | |
| 4,709,498 | 12/1987 | Wolski . | |
| 4,881,337 | 11/1989 | Mehl | 43/4 |

Primary Examiner—Kurt Rowan
Attorney, Agent, or Firm—Andsel Group, Inc.

[57] ABSTRACT

A fish bait applicator that has a finger grip with a light reflective, textured surface and has a attachment port to attach the applicator to the equipment or clothing of the user. The fingergrip also causes the applicator to float in water. There is a shaft with one end connected to the fingergrip. The shaft has on the other end a hook with a sharpened leading edge. There is a latch means that pivots over the hook to restrict access to the hook and to reduce the change of a leader loop from being dislodged from the hook when the applicator is being pulled back through the bait. There is a recess in the shaft to receive the latch means when the latch means is not in place over the hook. There is a latch means port into which the latch means is pivotally mounted.

6 Claims, 1 Drawing Sheet

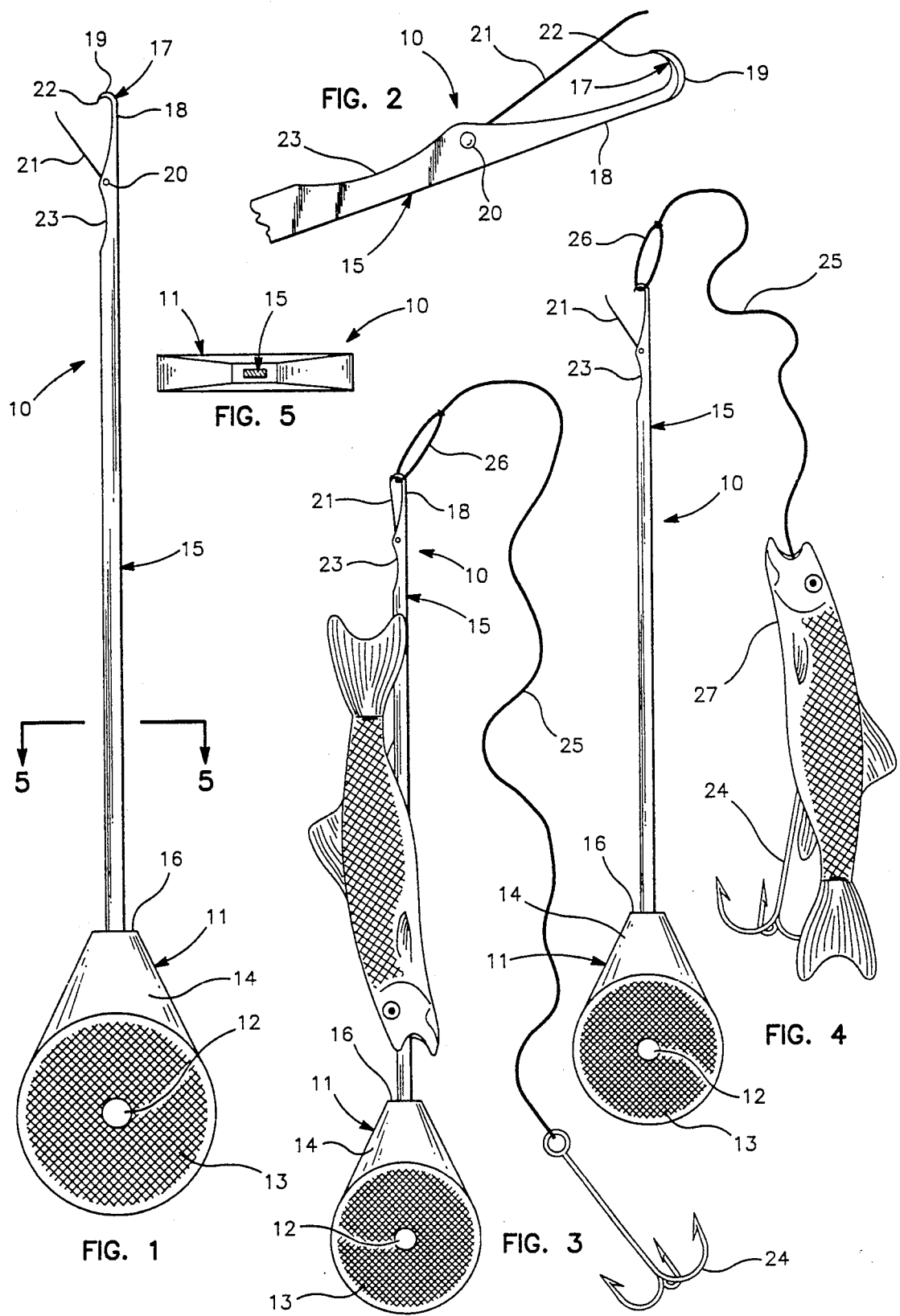

FISH BAIT APPLICATOR

BACKGROUND OF THE INVENTION

1. Field of the Invention

This invention relates to a fish bait applicator primarily used for baiting treble-style fish hooks with live and man-made bait or a combination of both without seriously damaging the bait.

2. Description of Related Art

Placing bait on a hook in an efficient manner has been a problem for fishermen for many years. The bait is often damaged to the point that it no longer attracts a fish or is so precariously perched on the hook that the fish dines on the bait without being snagged by the hook. Result, dinner for the fish. No dinner for the fisherman. Many devices have been tried to reduce damage to the bait and yet still secure it properly to the hook. Most of these devices failed to accomplish one or both of these objectives.

The treble hook is a great improvement over the single hook. When using a single hook and using minnows for bait, the hook is usually placed through the lips of the minnow. The fish often come up to the bait from behind and rip the bait off without ever coming near the hook. Using the treble hook and placing the hook near the end of the minnow is the preferred position for landing a fish when it strikes the bait. However, the problems encountered in baiting the hook increase. Treble hooks do not pass through bait easily. Especially when small bait like minnows, worms, marshmallows and large salmon eggs are used. With the present invention allowing the leader to pass easily through the eggs, the salmon eggs may be nested on the shank of the treble hook attracting the fish yet placing the eggs in a place where the fish will likely become hooked while attempting to access the eggs.

Devices to pass a leader through a bait to which a hook could then be attached were experimented with to try to alleviate the problems. Many of the devices destroyed the usefulness of the live bait since they damaged the respiratory organs of the bait. Dead bait is less attractive to the sought after fish. Delicate bait like the salmon egg was often destroyed attempting to pass the baiting tool through the egg. Some of the earlier tools have too many parts that could be lost while attempting to bait the hooks and once lost were useless to the user. Many of the earlier devices have various parts that must be engaged with each other constantly in the field. Many of these parts must slide within each other to function. If any of these parts become bent, corroded or matted with bait residue, they may fail to work at an inopportune time.

U.S. Pat. No. 2,603,026 to J. W. Duty on July 15, 1949 describes a live bait holder with spring loaded prongs to hold the bait in position on the holder and to pull the bait from the front. The device has a stiff piece of wire with a hook on one end to pull the bait holder into the bait. The holder and the hook may cause extensive damage to the bait.

U.S. Pat. No. 3,193,962 to R. Simpson on July 13, 1965 shows a device for inserting a leader into a bait. The device has a hollow piercer that is inserted into the body of the bait. The leader is then passed through the piercer. The piercer is then clamped to the head of the bait. This device is normally used for dead bait and since there is no latch over the loop hook of the device, the device is often very damaging to the bait and the leader loop could be easily dislodged from the hook. If any of the parts are bent, the device cannot be used. The device includes a tiny peg to secure the leader to a mouth piece in the mouth of the minnow so that the bait is pulled from the front and not from the fish hook at the rear. All these parts must be assembled at the fishing location and could be very easily lost either in the tackle box or over into the water rendering the device unusable.

U.S. Pat. No. 4,559,734 to Kenneth Sauer, et al. on Dec. 24, 1985 describes a worm baiting tool with a pointed end and with two grooves in the tool near the pointed end to grasp a loop in a leader. The tool is inserted into and through the worm, the leader loop placed in the groove and the tool with the leader pulled back through the worm. The leader often comes off when using this tool and the bait is further damaged when the tool is reinserted into the worm. U.S. Pat. No. 4,674,220 to Ronald H. Bearce, Jr., et al. on June 22, 1987 shows a hollow needle inserter that penetrates the bait until it exits the bait. The point of a fish hook is then placed in the tip of the hollow needle and the bait is pushed onto the hook and onto a line attached to the hook. This device is for single hooks only.

U.S. Pat. No. 4,706,403 to John L. Reynolds on Nov. 17, 1987 describes a device with a fishhook securing needle that is placed within a hollow needle. The hollow needle is passed through the bait, the fishhook secured by the securing needle and the bait pushed onto the fishhook and line. The leader loop hook has no latch cover and could be easily dislodged from the needle. All these parts are easily lost out in the fishing areas. If either needle is bent or becomes corroded, the device can no longer be used.

U.S. Pat. No. 4,709,498 to Frank Wolski on Dec. 1, 1987 discusses a method for mounting shrimp using a bait threading tool. The tool is a stiff piece of wire with a loop on one end. The wire passes through the shrimp and the loop pulls the leader through the shrimp. The device causes internal damage to the bait when the loop catches on vital organs and rips the flesh of the bait.

SUMMARY OF THE INVENTION

The present invention is a latch-hook device that is designed to assist in the baiting of a fish hook. The instant invention is used primarily for baiting a treble style hook but is equally valuable for placing bait on single or other style hooks and lures. One advantage of using the treble style hook, besides being three hooks instead of one, is that the treble hook holds bait such as dough, cheeses and marshmallows to the line more securely. Marshmallows are used for bait and as an attractive float. Their ability to float has a very narrow margin. If compressed slightly, they can sink and are therefore useless. The present invention pierces the marshmallow easily and does not compress the marshmallow. The treble hook also allows a combination of live and man-made baits to be used. The placement of the treble hook at the rear of the bait such as a minnow greatly enhances the chance of hooking a fish when it strikes the bait from behind or from the side. Getting the bait secured to the treble hook without damaging the bait to the point of rendering it almost useless or damaging it to the point that it came off during a cast or in the Water became a problem with the treble hook.

The instant invention is a versatile tool able to be used in still or fast water. The applicator is delicate and sharp enough to be used with the smallest salmon egg and thin enough to thread the smallest worm onto the leader and hook. Yet it is strong enough to be used on minnows up to four and one-half inches long.

In operation, with the latch means placed in the open position (see FIG. 1), the sharpened end of the hook on the shaft and the shaft is inserted and pushed through the bait, such as a minnow, as shown in FIG. 3 and preferably out the vent opening of the bait. The textured fingergrip assists in this by providing a surface that enhances the user's grip on the fingergrip. The slimness and the claimed features of the bait applicator allow the user to carefully bypass the respiratory organs of the minnow thus enabling the minnow to remain alive for a much longer period and to survive numerous casts and retrievals.

Once the hook and latch means of the applicator has passed beyond the end of the bait, a loop on a leader may be placed within the hook and the latch means closed over the hook. With the loop in the hook and with the latch closed over the hook, the applicator is pulled back through the bait until the loop of the leader clears the bait and a treble hook on the end of the leader opposite the loop end is snuggled up against the vent opening of the bait. The latch means substantially reduces the chance of the leader loop being dislodged from the hook and greatly reduces the possibility of additional damage to the bait that occurs when an uncovered hook snags on and tears the organs and flesh of the bait when the uncovered hook is dragged back through the bait. The attaching port in the fingergrip allows the user to attach a line to the applicator by passing the line through the port and securing the line to the fingergrip and to the clothing or other equipment of the user thus reducing the chance of loss. If the applicator is dropped by the user the light reflective surface of the fingergrip makes the applicator much easier to relocate and since the fingergrip is made of a material that will allow the applicator to float in water, the applicator does not sink to the bottom of a pool and out of sight.

After the leader is passed through the bait and the treble hook is secured in place, the applicator is passed through the lower and than the upper lip of the minnow, the end of the leader opposite the treble hook is secured to the applicator and the leader is drawn down through the upper and lower lip to sew close the lips. This reduces the amount of water that would otherwise enter the minnow and detract from the lifelike movements of the bait and prevents the minnow from swimming up the line and away from the treble hook.

A fish bait applicator has a fingergrip, a shaft with one end connected to the fingergrip and a hook on a other end of the shaft. The hook has a sharp leading edge. There is a latch means port in the shaft near the hook and a there is a latch means to restrict access to the hook that is pivotally mounted in the latch means port and extends over an end of the hook.

The fingergrip may be made of a material with a specific gravity less than 1.0. There may be an attaching port in the fingergrip. The fish bait applicator may have a textured surface on the fingergrip and may have a light-reflective surface on the fingergrip. There may be a recess in the shaft near the latch means port between the latch means port and the fingergrip to receive the latch means when the latch means is not over the hook.

It is therefore an object of this invention to provide a fish bait applicator that does very little damage to the bait and is easily inserted into and pulled back through the bait.

It is another object of this invention to provide a fish bait applicator that has a latch over the hook that reduces the chance of a loop on a leader line from falling off when the leader is drawn back through the bait.

It is yet another object of this invention to provide a fish bait applicator that floats, has a reflective and textured surface and has a means to attach the applicator to the user's clothes or equipment.

BRIEF DESCRIPTION OF THE DRAWINGS

FIG. 1 view of the fish bait applicator showing the latch means open.

FIG. 2 is an enlarged partial view of the insertion end of the applicator showing the latch means and the sharpened leading edge of the hook.

FIG. 3 is a longitudinal view of the applicator inserted into a bait and with a leader attached to the applicator and the latch means closed in preparation to pull the leader back through the bait.

FIG. 4 is a longitudinal view of the applicator being released from the leader once the bait secured on the leader and is placed in a position just before the hook.

FIG. 5 is a cross-sectional view along lines 5—5 of FIG. 1 showing the preferred shape of the fingergrip and the shaft.

DESCRIPTION OF THE PREFERRED EMBODIMENT

Referring to FIGS. 1,2,3,4 and 5, a fish bait applicator 10 is shown. A fish bait applicator 10 has a fingergrip 11 made of a material with a specific gravity less than 1.0 and the fingergrip has an attaching port 12 into which is placed a line to connect the applicator 10 to the user's equipment. There is a textured surface 13 and a light-reflective surface 14 on the fingergrip. The light reflective surface could be textured in combination. There is a shaft 15, preferably flat as shown in FIG. 5, with one end 16 connected to the fingergrip and there is a hook 17 on a other end 18 of the shaft 15. The hook 15 has a sharp leading edge 19.

There is a latch means port 20 in the shaft 15 near the hook 17. A latch means 21 to restrict access to the hook 17, such as a round or flat wire, pivotally mounted in the latch means port 20 and extending over an end 22 of the hook 17 is shown. There is a recess 23 in the shaft 15 near the latch means port 20 between the latch means port 20 and the fingergrip 11 to receive the latch means 21 when the latch means 21 is not over the hook 17.

For illustration of the use of the applicator 10, there is shown a treble hook 24, a leader line 25 and a loop 26 in the leader line that is placed into hook 17 when the loop 26 and the leader line 25 are ready to be pulled back through a bait 27. The applicator 10 and the treble hook 24 are shown protruding from the vent opening area at the rear of the bait 27, drawn to represent a minnow.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:
1. A fish bait applicator comprising:
 a. a fingergrip;
 b. a shaft with one end connected to the fingergrip;
 c. a textured surface on the fingergrip;

d. a light-reflective surface on the fingergrip;
e. a hook on a other end of the shaft;
f. the hook having a sharp leading edge;
g. a latch means port in the shaft near the hook; and
h. a latch means to restrict access to the hook pivotally mounted in the latch means port and extending over an end of the hook.

2. A fish bait applicator as described in claim 1 wherein the fingergrip is made of a material with a specific gravity less than 1.0.

3. A fish bait applicator as described in claim 1 further comprising an attaching port in the fingergrip.

4. A fish bait applicator comprising:
 a. a fingergrip made of a material with a specific gravity less than 1.0;
 b. an attaching port in the fingergrip;
 c. a textured surface on the fingergrip;
 d. a light-reflective surface on the fingergrip;
 e. a shaft with one end connected to the fingergrip;
 f. a hook on a other end of the shaft;
 g. the hook having a sharp leading edge;
 h. a latch means port in the shaft near the hook; and
 i. a latch means to restrict access to the hook pivotally mounted in the latch means port and extending over an end of the hook.

5. A fish bait applicator as described in claim 4 further comprising a recess in the shaft near the latch mean port between the latch means port and the fingergrip to receive the latch means when the latch means is not over the hook.

6. A fish bait applicator comprising:
 a. a fingergrip made of a material with a specific gravity less than 1.0;
 b. an attaching port in the fingergrip;
 c. a textured surface on the fingergrip;
 d. a light-reflective surface on the fingergrip;
 e. a shaft with one end connected to the fingergrip;
 f. a hook on a other end of the shaft;
 g. the hook having a sharp leading edge;
 h. a latch means port in the shaft near the hook;
 i. a latch means to restrict access to the hook pivotally mounted in the latch means port and extending over an end of the hook; and
 j. a recess in the shaft near the latch means port between the latch means port and the fingergrip to receive the latch means when the latch means is not over the hook.

* * * * *